Patented Mar. 10, 1936

2,033,853

UNITED STATES PATENT OFFICE 2,033,853

HYDRAULIC FLUID

Morton Roland Sherbino, Cleveland, Ohio, assignor to The Midland Steel Products Company, Cleveland, Ohio, a corporation of Ohio No Drawing. Application March 15, 1935,
Serial No. 11,359

10 Claims.  (Cl. 252—5)

This invention relates particularly to a fluid composition for use in transmitting pressures in hydraulic apparatus such as hydraulic transmissions, hydraulic jacks, door checks, shocks absorbers and more particularly for use in hydraulic brakes such as are used on automobiles, motor trucks, trailers and aeroplanes.

Adaptable to the severe service requirements of a fluid suited to the above purposes, I have discovered one which has no deleterious effect on the component parts of a brake system such as the metals used in the cylinders, pistons, tubing and rubber parts.

A series of carefully conducted tests has shown this fluid to have the least effect on the rubber parts of the system than any other brake fluid which to date has been marketed.

This fluid is truly a universal medium for the transmission of pressures, because its high boiling point and its low freezing point adapt it for use from the tropics to the Arctic regions without change of formula.

Brake fluids containing castor oil have many disadvantages, among which are its high freezing point, and its proneness to oxidize, leaving a sticky, gummy, semi-solid resin which has very little characteristics of a lubricant.

The oil to which this description relates is not a drying oil—therefore does not absorb oxygen or get gummy.

Its viscosity is such that it can readily be adjusted by the use of a low freezing, high boiling diluent and for this purpose I prefer to use one of the higher aliphatic alcohols such as butyl or amyl alcohol.

Where the fluid is to be used exclusively in cold climates, I prefer to use denatured ethyl alcohol and for warmer climates, butyl, amyl and so on down the list may be used to increase the boiling point as conditions may require. Thus it can be seen that my invention can readily be adapted for use in any climate by simply using a diluent having the proper freezing and boiling points.

What I desire to secure by Letters Patent is a fluid composition for use in hydraulic apparatus for the transmission of pressure consisting of the neutral salts of napthenic acid, diluted with an alcohol, ether, ester or glycol to give the proper viscosity, freezing point and boiling point.

The neutral salts of napthenic acid above referred to is the product produced by the interaction of napthenic acid with sodium, potassium, ammonium, triethanolamine, benzylamine or any alkali having one or more replaceable hydroxy groups.

Reference to the following formulæ shows a fluid which has given very good results as to cold test, lubricating value, non-corrosive qualifications, boiling point and inertness toward rubber and commercial availability.

A fluid for the transmission of pressure may be made by using the neutral salts of napthenic acid diluted to the proper consistency for adjustment of viscosity as follows:

10% to 90% salts of napthenic acid or napthenic acid soap.

90% to 10% diluent (alcohol, ether, ester, glycol etc.)

The percentage of these constituents may be varied within these ranges depending upon requirements for viscosity, temperature and cost; but a rather universal fluid has been derived from the following formula:

One gallon napthenic acid soap
Three gallons butyl alcohol (as the diluent.)

This compositon has a freezing point of approximately minus 75° Fahrenheit, a boiling point of approximately 230° F. and is non-corrosive to iron, copper, steel or aluminum and has no appreciable adverse effects on the rubber parts of the system.

I claim:

1. A fluid having no deterimental effects upon rubber consisting of napthenic acid soap in solution with an organic diluent composing 10% to 90% of the whole.

2. A fluid having no detrimental effects upon rubber composed of a napthenic acid soap of an inorganic alkali in solution with an organic diluent.

3. A fluid for use in hydraulic apparatus composed of a napthenic acid with a saponifying agent having one or more replaceable hydroxy groups in solution with an organic diluent.

4. A fluid for use in hydraulic apparatus composed of a neutral salt of napthenic acid in solution with an organic diluent.

5. A fluid for use in hydraulic apparatus composed of about 25% neutral napthenic acid soap and about 75% butyl alcohol.

6. A fluid for use in hydraulic apparatus composed of sodium napthenate in solution with an organic diluent.

7. A fluid for use in hydraulic apparatus composed of potassium napthenate in solution with an organic diluent.

8. A fluid for use in hydraulic apparatus composed of ammonium napthenate in solution with an organic diluent.

9. A fluid for use in hydraulic apparatus composed of a neutral salt of napthenic acid in solution with glycol.

10. A fluid for use in hydraulic apparatus composed of a neutral salt of napthenic acid in solution with butyl alcohol.

MORTON ROLAND SHERBINO.